United States Patent
Yun

(10) Patent No.: US 8,760,524 B2
(45) Date of Patent: Jun. 24, 2014

(54) METHOD AND APPARATUS FOR PROCESSING DIGITAL IMAGE

(75) Inventor: Jae-mu Yun, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 13/005,014

(22) Filed: Jan. 12, 2011

(65) Prior Publication Data

US 2011/0176015 A1 Jul. 21, 2011

(30) Foreign Application Priority Data

Jan. 19, 2010 (KR) ........................ 10-2010-0004756

(51) Int. Cl.
*H04N 5/228* (2006.01)
*H04N 5/225* (2006.01)
*G03B 17/00* (2006.01)

(52) U.S. Cl.
USPC ............... 348/208.1; 348/207.99; 396/52

(58) Field of Classification Search
USPC .......... 348/208.1–208.11; 396/52, 53, 55, 75
See application file for complete search history.

(56) References Cited

U.S. PATENT DOCUMENTS

| | | | | |
|---|---|---|---|---|
| 6,157,780 | A * | 12/2000 | Hamada et al. | 396/55 |
| 6,614,994 | B2 * | 9/2003 | Ohishi et al. | 396/55 |
| 7,400,825 | B2 | 7/2008 | Takeuchi et al. | |
| 7,639,933 | B2 * | 12/2009 | Seo et al. | 396/55 |
| 2005/0001906 | A1 * | 1/2005 | Sato et al. | 348/208.6 |
| 2009/0059016 | A1 * | 3/2009 | Moriya et al. | 348/208.1 |
| 2010/0194897 | A1 * | 8/2010 | Yumiki | 348/208.4 |

* cited by examiner

*Primary Examiner* — Trung Diep
(74) *Attorney, Agent, or Firm* — Drinker Biddle & Reath LLP

(57) ABSTRACT

Provided is a method of correcting handshake in a digital image processing apparatus. The digital image processing apparatus includes a lens location detector for detecting a location of the focusing lens when a lens driving unit drives a photographing lens group; a handshake detector for detecting an amount of handshake from a signal representing a movement of the digital image processing apparatus; and a handshake correction unit for adjusting the lens driving unit according to a difference between the amount of handshake detected by the handshake detector and the location of the focusing lens detected by the lens location detector.

22 Claims, 9 Drawing Sheets

METHOD AND APPARATUS FOR PROCESSING DIGITAL IMAGE

CROSS-REFERENCE TO RELATED PATENT APPLICATION

This application claims the benefit of Korean Patent Application No. 10-2010-0004756, filed on Jan. 19, 2010, in the Korean Intellectual Property Office, the disclosure of which is incorporated herein in its entirety by reference.

BACKGROUND

The invention relates to a method of controlling a digital image processing apparatus, and more particularly, to a method of correcting handshake in a digital image processing apparatus.

Handshake correction refers to a function for sensing and compensating for handshake of a user using a digital image processing apparatus by using a shake sensing unit and moving a lens to an opposite direction of the handshake direction. A gyro sensor may be used as the handshake sensing unit, and a voice coil motor (VCM), a piezoelectric motor (piezo motor), or a stepping motor may be used to drive the lens.

Conventional handshake correction methods may be classified into shot only mode methods and continuance mode methods. In a shot only mode correction method, a handshake correction function operates inside a camera when a live view screen is turned off after pushing a shutter in a full-pushed mode. Thus, since the handshake correction operates for a short period of time, power consumption is low. In a continuance mode correction method, a handshake correction function is performed continuously after the camera is turned on. Thus, the user of the camera may see images with no handshake as live view images all the time, however, the power consumption increases.

A release mode handshake correction method combines the advantages of the shot only mode method and the continuance mode method. However, in a digital image processing apparatus using the release mode handshake correction method, a live view image moves abruptly. In addition, a shooting time is increased, and thus, it is not easy to perform successive shooting operations.

SUMMARY

Various embodiments of the invention provide a digital image processing apparatus which supports a fast successive shooting by increasing shooting speed.

According to an embodiment of the invention, there is provided a digital image processing apparatus including a lens driving unit for driving a focusing lens included in a photographing lens; a lens location detector for detecting a location of the focusing lens when the lens driving unit drives the photographing lens; a handshake detector for detecting the amount of handshake from a signal representing a movement of the digital image processing apparatus; and a handshake correction unit for adjusting the lens driving unit according to a difference between the amount of handshake detected by the handshake detector and the location of the focusing lens detected by the lens location detector.

According to another embodiment of the invention, there is provided a method of correcting handshake in a digital image processing apparatus, which comprises a handshake correction apparatus including a lens location detector for detecting a location of a focusing lens when a photographing lens is driven; and a handshake detector for detecting the amount of handshake from a signal representing a movement of the digital image processing apparatus, the method including driving the handshake correction apparatus when a shutter of the digital image processing apparatus is half-pushed; when the shutter is full-pushed, turning off a live view screen until image light of a subject obtained by the photographing lens is converted into an electric signal to generate an image signal; turning on the live view screen when the image signal is generated, and driving a high pass filter of the handshake detector; and adjusting a location of the focusing lens according to a difference value between the amount of handshake detected by the handshake detector and a location of the focusing lens sensed by the lens location detector.

According to another embodiment of the invention, there is provided a method of correcting handshake in a digital image processing apparatus, the method including driving a focusing lens by a lens driving unit; sensing a location of the focusing lens when the lens driving unit drives the focusing lens; detecting the amount of handshake from a signal representing a movement of the digital image processing apparatus; and adjusting the lens driving unit according to a difference value between the detected amount of handshake and the sensed location of the focusing lens.

According to another embodiment of the invention, there is provided a method of correcting handshake in a digital image processing apparatus, which comprises a handshake correction apparatus including a lens location detector for detecting a location of a focusing lens when a photographing lens is driven; and a handshake detector for detecting handshake from a signal representing a movement of the digital image processing apparatus and removing noise components by using a high pass filter, the method including driving the handshake correcting apparatus when a shutter of the digital image processing apparatus is half-pushed; driving the high pass filter of the handshake detector when the half-pushed shutter is released; and adjusting the location of the focusing lens according to a difference value between the amount of handshake detected by the handshake detector and a location of the focusing lens detected by the lens location detector.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, embodiments of the invention will be described with reference to accompanying drawings.

Figure 1:
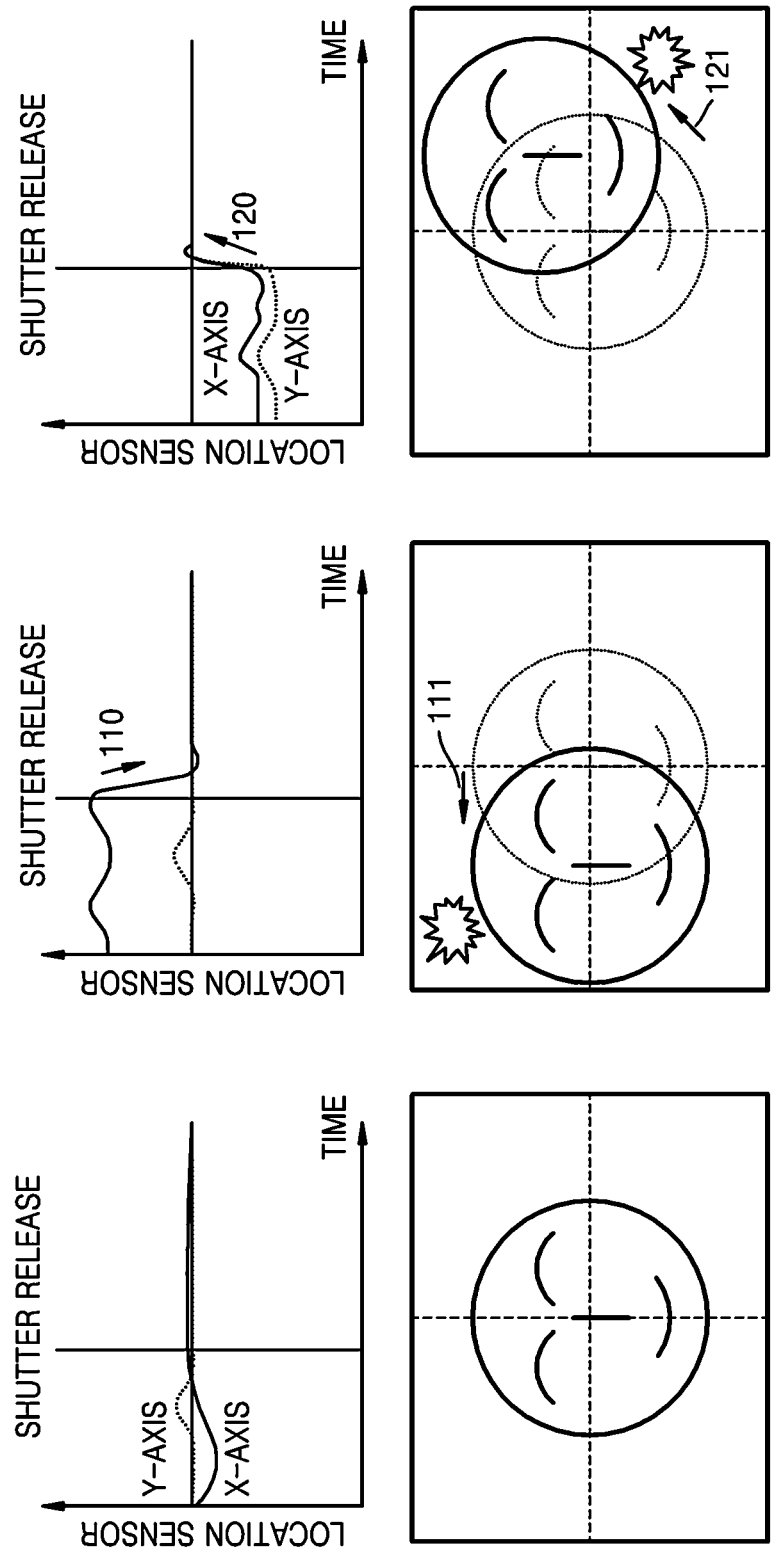
FIG. 1 is a series of pictorial live view images with associated graphs when a shutter is released from a half-pushed position in a digital image processing apparatus using a release mode handshake correction method according to the prior art.

FIG. 1 shows live view images (a) through (c) when a half-pushed shutter is released in a digital image processing apparatus using a release mode handshake correction function according to the prior art.

According to the release mode hand correction method, a standby mode is maintained before a camera is turned on and an image is captured, and a handshake correction function is performed from when the user half-pushes the shutter.

In the digital image processing apparatus using the release mode handshake correction function according to the prior art, when the shutter is released while using the handshake correction function, a delay occurs to return a lens of the digital image processing apparatus to a center portion. For example, when a voice coil motor (VCM) drives the lens, a delay of about 30 ms occurs, and when the lens is driven using a piezo motor, a delay of about 100 ms occurs. In addition, due to the delay time to return the lens to the center position, a shooting time is increased.

Furthermore, since the lens suddenly moves to the center portion, shock noise is generated and the lens vibrates minutely. In addition, when the live view screen is turned on while the lens vibrates, a blurred image is shown as the live view image.

In more detail, when the lens is located at the center portion before releasing the shutter as shown in the leftmost pictorial image and graph of FIG. 1, the image is not blurred even when the shutter is released.

In the center pictorial image and graph of FIG. 1, in a status where the lens is moved at a center portion of a Y-axis and an upper portion of an X-axis before the shutter is released (110), when the shutter is released, the live view image bounces to the left side (111) along the X-axis while the lens returns to the center position.

In the rightmost pictorial image and graph of FIG. 1, when the lens is moved to lower portions of the X-axis and Y-axis before releasing the shutter (120) and the shutter is released, the live view bounces in a diagonal direction (121) while the lens returns to the center position.

In particular, in a digital image processing apparatus 1 (see FIG. 2) according to an embodiment of the invention, since an image shown in an electronic viewfinder (EVF) is the same as the image displayed on a liquid crystal display (LCD) screen, the user may see the bounce of the image on the live view.

The embodiments of the invention are to address problems shown in FIG. 1.

Figure 2:
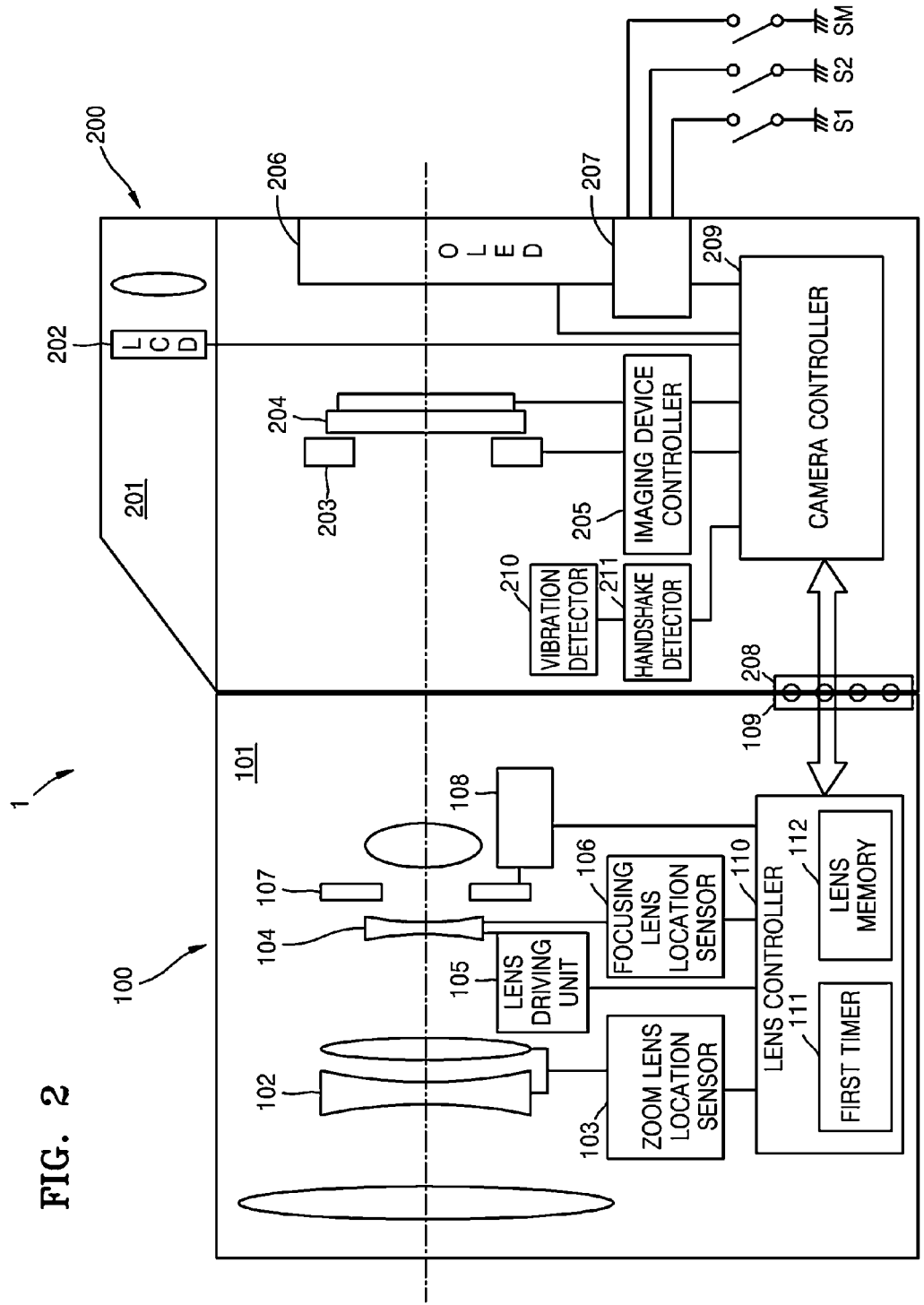
FIG. 2 is a schematic block diagram of a digital image processing apparatus, according to an embodiment of the invention.

FIG. 2 is a schematic block diagram of a digital image processing apparatus 1 according to an embodiment of the invention.

Referring to FIG. 2, the digital image processing apparatus 1 of the present embodiment includes an exchangeable lens 100 and a main body 200. The exchangeable lens 100 has a focus detecting function, and the main body 200 makes the photographing lens (ex: exchangeable lens 100) drive a focusing lens 102. A handshake correction apparatus of the present embodiment may be installed in a digital photographing apparatus, for example, a digital compact camera (DSC), a digital single lens reflex (DSLR) camera, or a camcorder, in addition to the digital image processing apparatus 1 of FIG. 2 in order to correct handshake during photographing.

The exchangeable lens 100 (hereinafter, referred to as the "lens") includes a focusing optics 101, a zoom lens location sensor 103, a lens driving unit 105, a focusing lens location sensor 106, an aperture driving unit 108, a lens mount 109, and a lens controller 110.

The focusing optics 101 includes a zoom lens 102 for zooming, a focusing lens 104 changing a focusing position, and an aperture 107. The zoom lens 102 and the focus lens 104 may be formed as a lens group including a plurality of lenses. A mechanical shutter may be used as the shutter.

The zoom lens position sensor 103 and the focusing lens position sensor 106 respectively sense locations of the zoom lens 102 and the focusing lens 104. The time of sensing the location of the focusing lens 104 may be set by the lens controller 110 or a camera controller 209 that will be described later. For example, the time of sensing the location of the focusing lens 104 may be the time of detecting an auto focus (AF) from an image signal.

The zoom lens position sensor 103 and the focusing lens position sensor 106 may respectively include a hall sensor. The hall sensor outputs a signal according to a dislocation of the lens generated due to a shock. The signal output from the hall sensor is generated by the dislocation due to the shock caused when operating the shutter. In general, the hall sensor, a hall device, or a magnetic unit installed in the handshake correction apparatus measures a location of the lens or a charge coupled device (CCD) to use the location as feedback information for compensating for the handshake.

The lens driving unit 105 and the aperture driving unit 108 are controlled by the lens controller 110 to drive the focusing lens 104 and the aperture 107. In particular, the lens driving unit 105 drives the focusing lens 104 in an optical axis direction.

The lens controller 110 includes a first timer 111 for measuring time and a lens memory 112 storing information about the lens. The lens controller 110 transmits the information about the location of the focusing lens 104 to the main body 200. At this time, the lens controller 110 may transmit the location information of the focusing lens 104 when the location of the focusing lens 104 changes or the camera controller 209 requests the information about the location information of the focusing lens 104. In addition, the first timer 111 may be reset by a reset signal transmitted from the main body 200, and the lens 100 and the main body 200 may be synchronized by the reset operation.

The lens mount 109 includes a communication pin at a lens side, which is engaged with a communication pin at a camera side to be used as a transfer path of data or control signals.

Structures of the main body 200 will be described as follows.

The main body 200 includes an EVF 201, a shutter 203, an imaging device 204, an imaging device controller 205, a display unit 206, a manipulation button 207, a camera mount 208, a camera controller 209, a vibration detector 210, and a handshake detector 211.

The EVF 201 may include a liquid crystal display (LCD) unit 202, and a user may see captured images in real-time. The shutter 203 determines a time of applying light to the imaging device 204, that is, an exposure time.

The imaging device 204 captures light of an image transmitting through the focusing optics 101 of the lens 100 to generate an image signal. The imaging device 204 may include a plurality of photoelectric conversion units arranged in a matrix, and a vertical and/or horizontal transmitting path for moving electric charges from the photoelectric conversion units to read the image signal. The imaging device 204 may be a CCD sensor, a complementary metal oxide semiconductor (CMOS) sensor, or other similar unit.

The imaging device controller 205 generates a timing signal, and controls the imaging device 204 to capture images in synchronization with the timing signal. The display unit 206 displays various images and information. The display unit 206 may be, e.g., an organic light emitting device (OLED) or other similar unit.

The manipulation button 207 allows the user to input commands in order to manipulate the digital image processing apparatus 1. The manipulation button 207 may include various buttons such as a shutter release button, a main switch, a mode dial, and a menu button. In FIG. 2, S1 denotes a half-shutter switch, S2 denotes a full-shutter switch, and SM denotes a main switch.

The camera controller 209 detects AF from the image signal generated by the imaging device 204 to calculate an AF evaluation value. The camera mount 208 includes the communication pin at the camera side.

The digital image processing apparatus 1 includes the vibration detector 210 and the handshake detector 211 in order to correct vibrations of the main body 200 caused by the handshake. The vibration detector 210 may be a gyroscope sensor, an angular speed sensor, an acceleration sensor, or similar device. The handshake detector 211 converts the handshake signal detected by the vibration detector into a digital signal, and outputs a signal for controlling the lens by using an integral calculation and a high pass filter. The vibration detection will be described in more detail with reference to FIG. 3.

Hereinafter, operations of the lens 100 and the main body 200 will be described as follows.

When a subject is photographed, the main switch SM included in the manipulation button 207 is operated to start operation of the digital image processing apparatus 1. The digital image processing apparatus 1 displays live view images as follows.

Light bouncing off the subject and passing through the focusing optics 101 is incident onto the imaging device 204. At this time, the shutter 203 is in an opened state. The incident light is converted into an electric signal by the imaging device 204, and thus, an image signal is generated. The imaging device 204 is operated by a timing signal generated by the imaging device controller 205. The image signal of the subject is converted into displayable data in the camera controller 209, and output to the EVF 201 and the display unit 206. The display operation is referred to as live view display, and the live view image displayed by the live view display is continuously displayed as a moving picture.

After displaying the live view image, when the shutter release button is half-pushed (S1), the digital image processing apparatus 1 starts the AF operation. The AF operation is performed by using the image signal generated by the imaging device 204, a focusing position is calculated from the AF evaluation value relating to a contrast value according to a contrast AF method, and then, the lens 100 is driven based on the above calculation. The AF evaluation value is calculated by the camera controller 209. The camera controller 209 calculates information for controlling the focusing lens 104 from the AF evaluation value, and transmits the information to the lens controller 110 via the communication pins in the lens mount 109 and the camera mount 208.

The lens controller 110 controls the lens driving unit 105 based on the information transmitted from the camera controller 209 to drive the focusing lens 104 in the optical axis direction to perform the AF operation. A location of the focusing lens 104 is monitored by the focusing lens position sensor 106 and feedback-controlled.

When the zoom lens 102 is manipulated by the user, the zoom lens position sensor 103 detects the location of the zoom lens 102, and the lens controller 110 performs the AF operation again after changing AF control parameters of the focusing lens 104. The AF control parameters are information of the exchangeable lens and are stored in the lens memory 112. When the location of the zoom lens group is changed, the driving amount of the focusing lens and conversion factors of focus deviation amount are changed. The AF control parameters include the driving amount of the focusing lens included in a photographing lens and the conversion factors of a focus deviation amount.

After the above operations, when the subject image is in the focused state, the shutter release button is full-pushed (S2) and the digital image processing apparatus 1 performs the exposure. At this time, the camera controller 209 closes the shutter completely, and transmits obtained light measurement information to the lens controller 110 as aperture controlling information. The lens controller 110 controls the aperture driving unit 108 based on the aperture controlling information, and adjusts the aperture 107 with an appropriate aperture value. The camera controller 209 controls the shutter 203 based on the light measurement information, and opens the shutter 204 for an appropriate exposure time to capture the subject image. In a moving picture shooting mode, the digital image processing apparatus 1 takes moving pictures, and ends the shooting of the moving picture when the shutter release button is changed into a turn-off state from the full-pushed state (S2).

The captured images are processed and compressed to be stored in a memory card (212, refer to FIG. 2). At the same time, the captured image is output to the EVF 201 and the display unit 206. The image displayed on the EVF 201 and the display unit 206 is referred to as a quick-view image. Then, a series of photographing operations are finished.

In the case of moving pictures, the captured images are compressed when taken and stored in the memory card 212. In the moving picture shooting mode, a live view image is displayed on the EVF 201 and the display unit 206, not a quick-view image.

The manipulation button 207 may be used to change between the still image mode and the moving picture shooting mode. When the half-pushed switch S1 is turned on, the same operation is performed in both the still image mode and the moving picture shooting mode. When the full-pushed switch S2 is turned on, the still image is captured in the still image mode and the recording of moving picture starts in the moving picture shooting mode.

Figure 3:
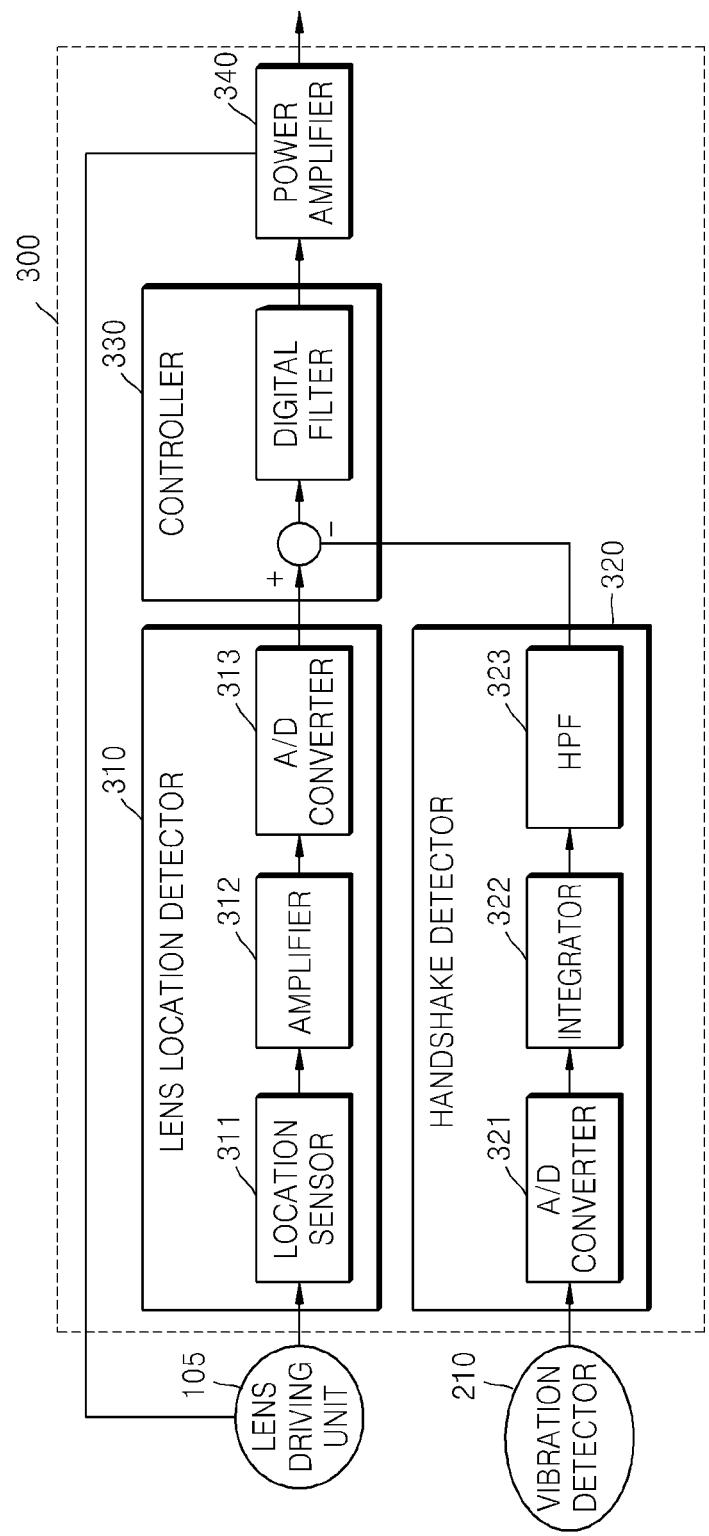
FIG. 3 is a block diagram of a handshake correction apparatus according to an embodiment of the invention.

FIG. 3 is a block diagram of a handshake correction apparatus 300 according to an embodiment of the invention.

The handshake correction apparatus 300 controls the lens to move as much as a difference between the digital signal output from a lens position detector 310 and the digital signal output from a handshake detector 320 to compensate for the handshake, based on the signals transmitted from the lens driving unit 105 and the vibration detector 210.

The handshake correction apparatus 300 includes the lens position/location detector 310, the handshake detector 320, a controller 330, and a power amplifier 340. The lens position detector 310 includes a location sensor 311, an amplifier 312, and an analog/digital (A/D) converter 313. The handshake detector 320 includes an A/D converter 321, an integrator 322, and a high pass filter (HPF) 323.

The lens driving unit 105 drives the focusing lens 104 (FIG. 2) in the optical axis direction by using a VCM, a piezo motor, or a stepping motor. The vibration detector 210 is a unit for sensing the handshake, and may be a gyro-sensor.

When the lens driving unit 105 drives the focusing lens in the optical axis direction, the location sensor 311 detects the location of the focusing lens 105. The location sensor 311 may be a hall sensor. The location signal sensed by the location sensor 311 may be weak (perhaps a few mV), and thus, is amplified tens of times or more by the amplifier 312. An operation amplifier (OP-AMP) may be used as the amplifier 312. The analog signal passing through the amplifier 312 is converted into the digital signal by the A/D converter 313.

The handshake detector 320 processes the analog signal transmitted from the vibration detector 210 to form a control signal that may control the lens. The analog signal output from the vibration detector 210 is converted into the digital signal by the A/D converter 321. The integrator 322 performs an integral calculation of the digital signal, and then, the digital signal passes through the high pass filter 323 to remove noise components in the digital signal. Then, the digital signal controls the focusing lens 104 to return to the center portion.

For example, if the vibration detector 210 is the gyrosensor which outputs an angular velocity signal, the angular velocity signal is converted into the digital signal by the A/D converter 321, and then, is converted into an angular signal by the integral calculation of the integrator 322. After that, the angular signal passes through the high pass filter 323 to remove noise components therefrom.

The handshake detector 320 detects a handshake signal generated from the digital image processing apparatus. The handshake detector 320 may include a gyroscope sensor, an angular velocity sensor, or an acceleration sensor.

The controller 330 calculates a difference signal between the digital signal output from the lens position detector 310 and the digital signal output from the handshake detector 320 by using a digital filter 331. The digital filter 331 may use a proportional integral derivative (PID) control. The difference signal calculated by the controller 330 is amplified by a power amplifier 340, and used to drive the lens driving unit 105.

Figure 4:
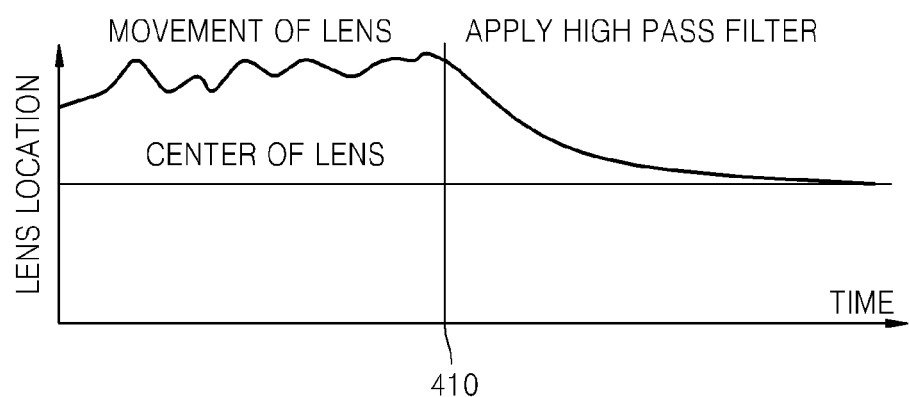
FIG. 4 is a graph showing a performance of a high pass filter used in the handshake correction apparatus of FIG. 3, according to an embodiment of the invention.

FIG. 4 is a graph illustrating a function of the high pass filter 323 used in the handshake correction apparatus 300, according to the embodiment of the invention.

When the handshake correction apparatus 300 is operated, the lens moves continuously, and then, when the high pass filter 323 (FIG. 3) operates, the lens is slowly returned to the center position (410). At this time, the returning time may vary depending on a coefficient of the high pass filter 323. When a blocking frequency of the high pass filter is increased, the lens rapidly returns to the center portion, and when the blocking frequency of the high pass filter 323 is reduced, the lens returns more slowly to the center portion.

Figure 5:
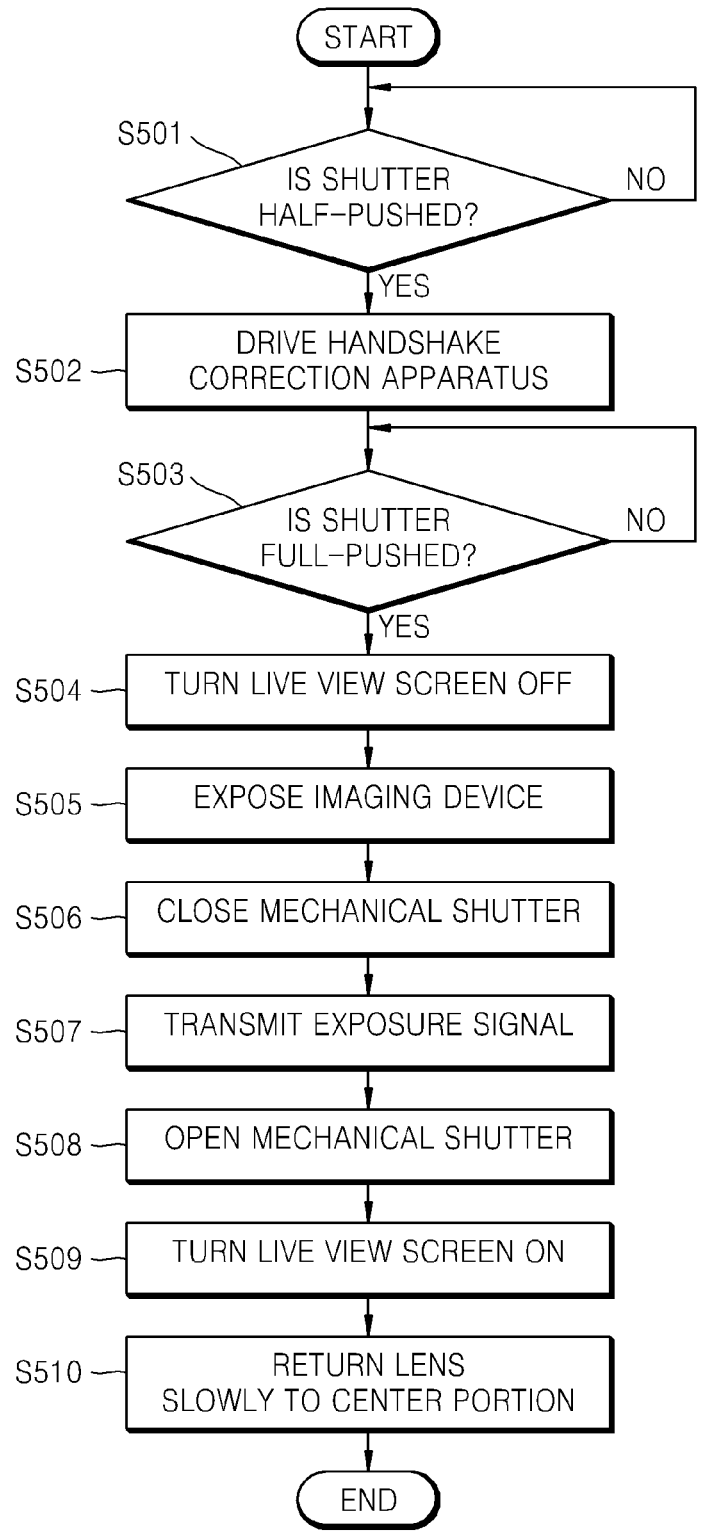
FIG. 5 is a flowchart illustrating processes of driving the handshake correction apparatus of FIG. 3 in the digital image processing apparatus of FIG. 2, according to an embodiment of the invention.

FIG. 5 is a flowchart illustrating processes of operating the handshake correction apparatus 300 in the digital image processing apparatus 1, according to an embodiment of the invention.

FIG. 5 shows photographing operations by using an improved release mode handshake correction function. When the user of the digital image processing apparatus 1 pushes the shutter in a half-pushed state (S501), the handshake correction apparatus 300 included in the digital image processing apparatus 1 starts to operate (S502). In the half-pushed state of the shutter (S501), the lens driving unit 105 shown in FIG. 3 and the vibration detector 210 in the digital image processing apparatus 1 are operated to input signals in the handshake correction apparatus 300 (refer to FIG. 3), and then, the handshake correction apparatus 300 starts to operate.

Next, the shutter is full-pushed (S503), and then, the live view screen is turned off (S504), and the imaging device is exposed (S505). At the end of the exposure operation, the mechanical shutter is closed (S506). The image signal obtained from the exposure is converted into the digital signal and the captured image is transmitted to a main digital signal processor (DSP) of the digital image processing apparatus 1 (S507). After that, when the shutter is opened again (S508), the live view screen is turned on (S509), and then, the handshake correction apparatus 300 is operated to return the lens to the center portion and prepare next photographing operation (S510).

Since the lens returns to the center portion after the live view screen is turned on, the returning time of the lens may not be considered. In addition, since the high pass filter 323 is used, the vibration generated during the returning of the lens is not generated. Therefore, the live view image does not bounce.

Figure 6:
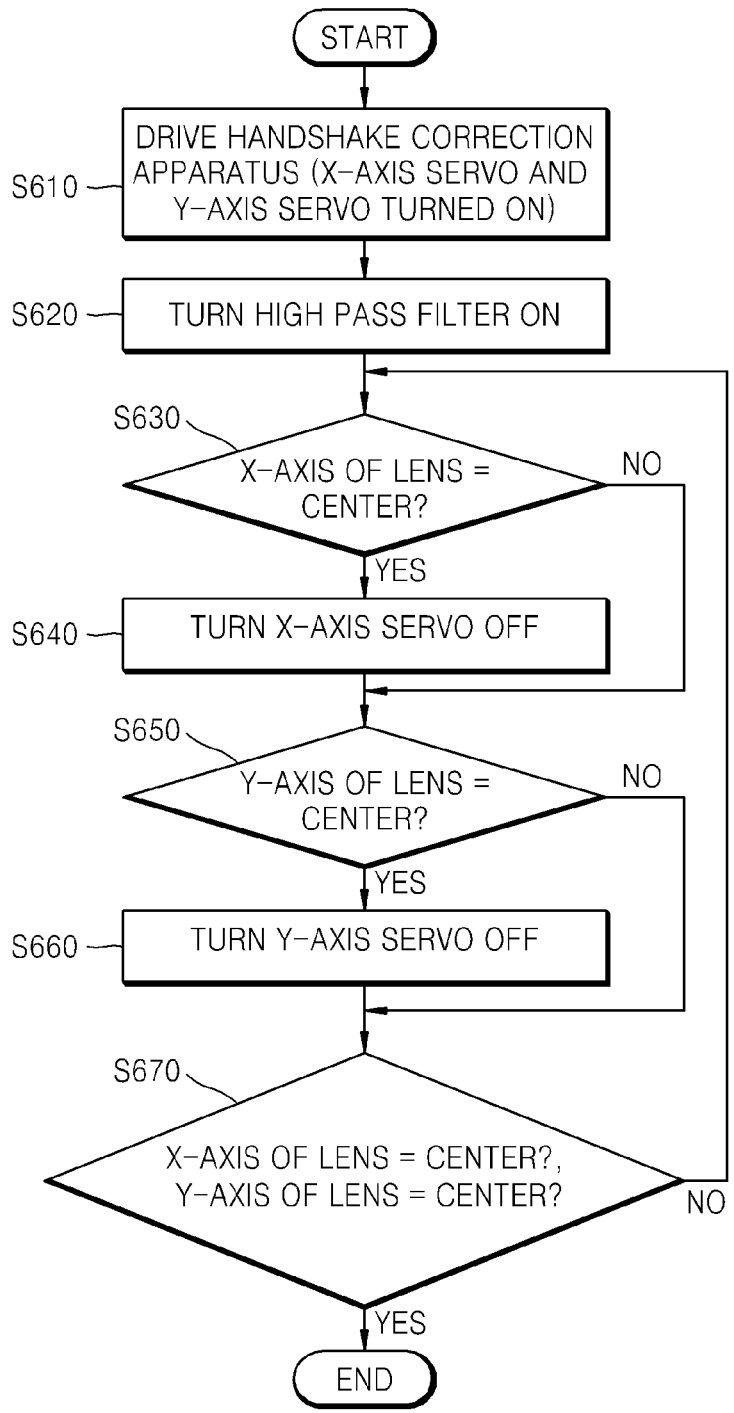
FIG. 6 is a flowchart illustrating processes of returning a lens to a center position by using the handshake correction apparatus of FIG. 3 in the digital image processing apparatus of FIG. 2, according to an embodiment of the invention.

FIG. 6 is a flowchart illustrating operations of returning the lens to the center portion by using the handshake correction apparatus 300 in the digital image processing apparatus 1, according to the embodiment of the invention. FIG. 6 shows operation S510 of FIG. 5 in detail.

When the handshake correction apparatus 300 is operating, the high pass filter 323 (FIG. 3) is turned on, and the lens starts to return to the center portion. The handshake correction apparatus 300 is driven from the time when the lens starts to return to the time when the lens is located on center portions of X-axis and Y-axis.

In more detail, when the handshake correction apparatus 300 is driven, servos of X-axis and Y-axis of the lens are turned on (S610). After that, the high pass filter 323 of the handshake correction apparatus 300 is turned on, and the lens starts to return to the center portion. It is determined whether the lens returns to the center portion of the X-axis (S630), the X-axis servo of the lens is turned off when the lens returns to the center portion in the X-axis, and it is determined whether the lens returns to the center portion in the Y-axis (S650) when the lens does not return to the center portion in the X-axis. If the lens returns to the center portion in the Y-axis, the Y-axis servo of the lens is turned off (S660). It is determined whether the lens returns to the center portions in both of the X-axis and Y-axis (S670), and when the lens is located at the center portion in X and Y-axis, operation S510 of FIG. 5 is finished. If not, the operation returns to operation S630, and it is repeatedly checked whether the lens returns to the center portion in the X-axis and the Y-axis. If the user performs a photographing operation again during returning of the lens, the handshake correction apparatus 300 is operated at the current position of the lens. The operation of the handshake correction apparatus 300 will be described as follows with reference to FIG. 7.

Figure 7:
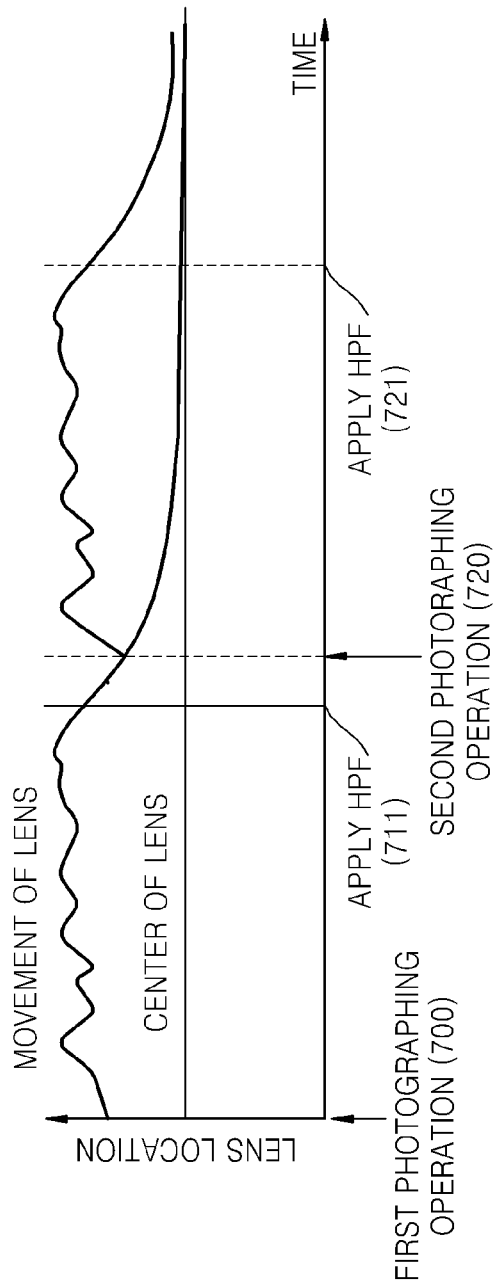
FIG. 7 is a graph showing an operation of the handshake correction apparatus of FIG. 3 when a user captures an image again during returning the lens to the center position, according to an embodiment of the invention.

FIG. 7 shows an operation of the handshake correction apparatus 300 when the user performs the photographing operation during returning of the lens to the center portion.

When the user performs a first photographing operation 700, the live view screen is turned off, and the mechanical shutter is closed when the exposure operation is ended to take an image. After that, the mechanical shutter is opened again, and then, the live view screen is turned on at a point 711, and the handshake correction apparatus 300 is operated to return the lens to the center portion and prepare next photographing operation. When a second photographing operation is performed during the returning of the lens (720), the live view screen is turned off, and the mechanical shutter is closed when the exposure operation is ended to take the image. After that, when the mechanical shutter is opened again, the live view screen is turned on at a point 721, and the handshake correction apparatus 300 is operated to return the lens to the center portion.

As described above, since the live view screen is already turned on when the lens starts to return to the center portion, the user may perform the photographing operation before the lens completely returns at the center portion. Therefore, successive photographing operations may be performed rapidly.

Figure 8:
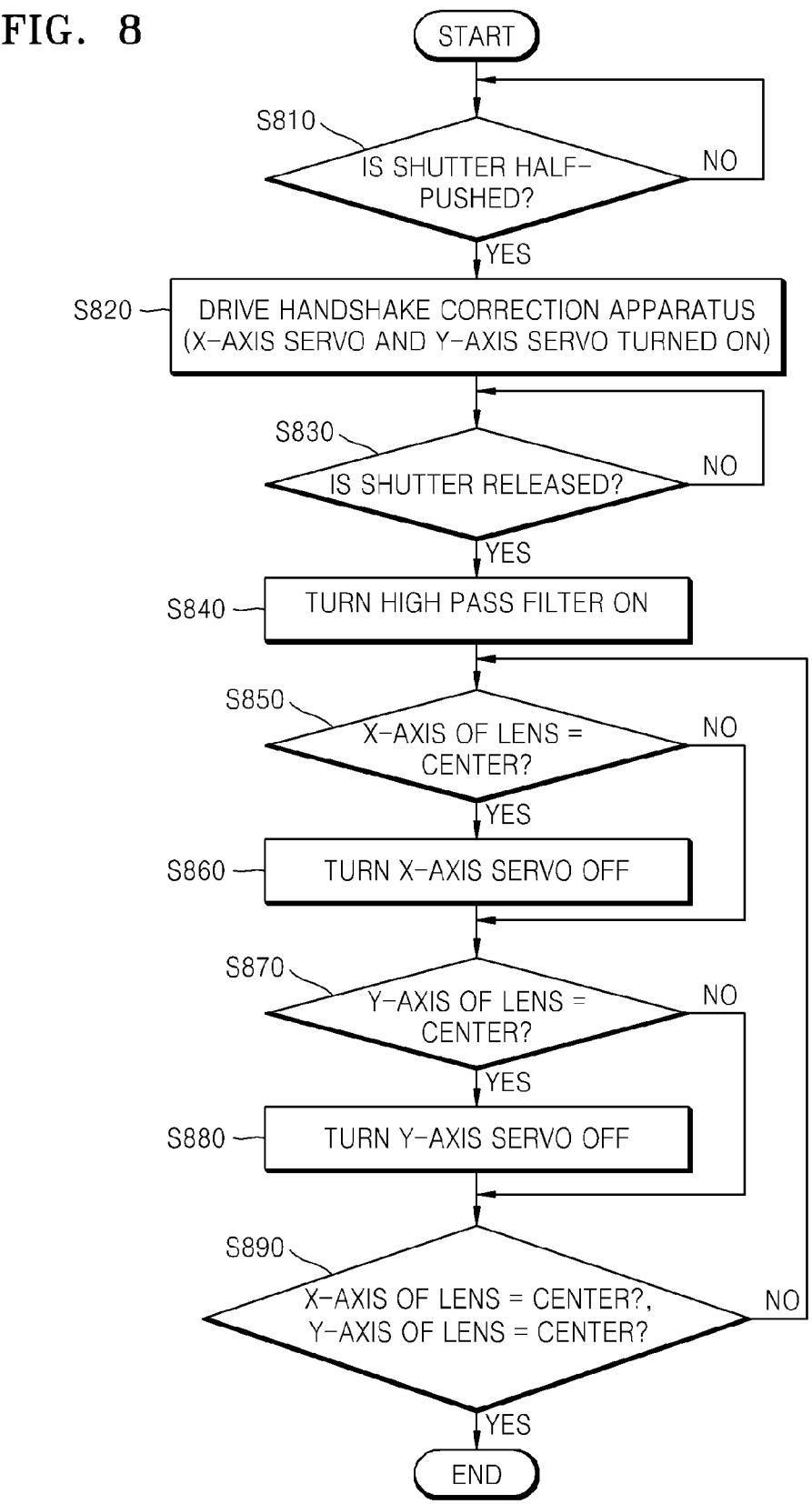
FIG. 8 is a flowchart illustrating processes of returning a lens to a center position by using a handshake correction apparatus of FIG. 3 when a shutter is released from a half-pushed position, according to an embodiment of the invention.

FIG. 8 is a flowchart illustrating operations of returning the lens to the center portion by operating the handshake correction apparatus 300 when a half-pushed shutter is released in the digital image processing apparatus 1, according to the embodiment of the invention.

According to the handshake correction apparatus 300 of the present embodiment, vibration generated when the shutter that is in the half-pushed state is released without performing the photographing operation may be corrected. When the user half-pushes the shutter (S810), the handshake correction apparatus 300 is driven to turn on the X-axis and Y-axis servos of the lens (S820). After that, if the user releases the shutter without performing the photographing operation (S830), the high pass filter 323 of the handshake correction apparatus 300 is turned on (S840), and operations of checking whether the lens returns at the center portion in both of the X-axis and the Y-axis are performed (S850-S890). Through the above operations, the vibration generated by the returning of the lens to the center portion may be reduced even when the shutter in the half-pushed state is released.

Figure 9:
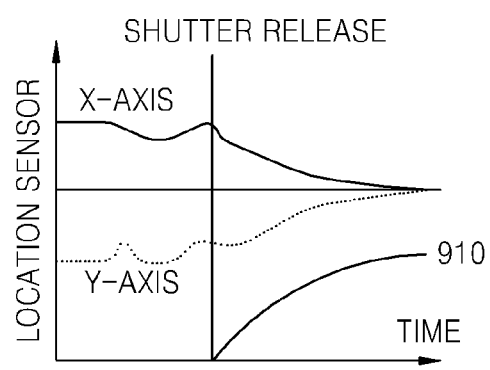
FIG. 9 is a pictorial live view image with associated graph when a shutter is released from a half-pushed position in using the handshake correction apparatus of FIG. 3, according to an embodiment of the invention.
Figure 9:
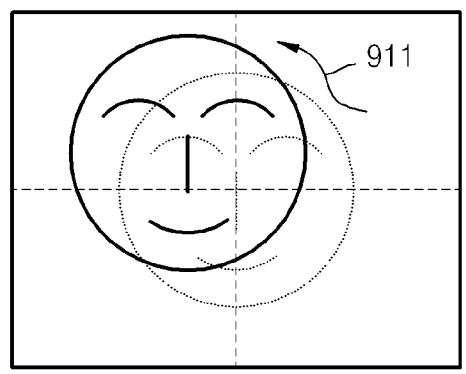

FIG. 9 shows a live view image and graph when the half-pushed shutter is released when the handshake correction apparatus 300 is used, according to an embodiment of the invention.

According to the handshake correction apparatus 300, when the half-pushed shutter is released without performing the photographing operation, the handshake may be corrected. When the user half-pushes the shutter, the handshake correction apparatus 300 is operated, and when the shutter is released, the high pass filter 323 of the handshake correction apparatus is operated, and the lens slowly returns to the center portion according to a coefficient of the high pass filter 323. If the blocking frequency of the high pass filter 323 is high, the lens rapidly returns, and if the blocking frequency of the high pass filter is low, the lens more slowly returns. Therefore, the user may see a continuous image even when the half-pushed shutter is released without performing the photographing operation.

A program for executing the handshake correction method according to the embodiments of the invention may be stored in a non-transitory recording medium. The recording medium may be the memory 211 shown in FIG. 2, or an additional recording medium. Examples of the recording medium include magnetic storage media (e.g., hard disk), and optical recording media (e.g., CD-ROMs, or DVDs).

According to the embodiments of the invention, bounce of an image occurring when the lens returns to the center portion in the conventional release mode handshake correction method may be prevented. In addition, in the digital image processing apparatus using the handshake correction apparatus of the embodiments of the invention, since the lens returns to the center portion after the live view screen is turned on, a time delay caused by the time of returning the lens is prevented, and thus, the successive photographing operations may be performed rapidly.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital image processing apparatus comprising:
   a lens driving unit for driving a focusing lens;
   a lens location detector for detecting a location of the focusing lens when the lens driving unit drives the focusing lens;
   a handshake detector for detecting an amount of handshake from a signal representing a movement of the digital image processing apparatus; and
   a handshake correction unit for adjusting the lens driving unit according to a difference between the amount of handshake detected by the handshake detector and the location of the focusing lens detected by the lens location detector;
   wherein after the shutter is deactivated the handshake detector turns on a high pass filter to remove the noise components from the signal representing the amount of handshake, and
   wherein the handshake correction unit adjusts the focusing lens to return to the center portion in an X-axis and a Y-axis of the focusing lens after applying the high pass filter.

2. The digital image processing apparatus of claim 1, wherein the lens driving unit uses at least one of a voice coil motor (VCM), a piezo motor, and a stepping motor.

3. The digital image processing apparatus of claim 1, wherein the lens location detector comprises amplifier circuitry that amplifies a location signal of the focusing lens that is sensed by using a hall sensor and converts the location signal to a digital signal.

4. The digital image processing apparatus of claim 1, wherein the handshake detector receives the signal representing the movement of the digital image processing apparatus, converts the received signal to a digital signal, performs an integral calculation with respect to the digital signal, and removes noise components from the digital signal.

5. The digital image processing apparatus of claim 1, wherein the speed of return is determined by the blocking frequency of the high pass filter.

6. The digital image processing apparatus of claim 5, wherein when the high pass filter is turned on after a shutter is full-pushed, a live view is turned on before the photographing lens returns to the center portion.

7. The digital image processing apparatus of claim 5, wherein when the shutter that is in a half-pushed position is released without performing a photographing operation, the high pass filter is turned on.

8. The digital image processing apparatus of claim 1, wherein the handshake detector comprises at least one of a gyroscope sensor, an angular velocity sensor, and an acceleration sensor.

9. A method of correcting handshake in a digital image processing apparatus, which comprises a handshake correction apparatus including a lens location detector for detecting a location of a focusing lens when a photographing lens is driven; and a handshake detector for detecting an amount of handshake from a signal representing a movement of the digital image processing apparatus, the method comprising:
   driving the handshake correction apparatus when a shutter of the digital image processing apparatus is half-pushed;
   when the shutter is full-pushed, turning off a live view screen until image light of a subject obtained by the photographing lens is converted into an electric signal to generate an image signal;
   after the image signal generated and a photographing operation is completed, turning on the live view screen, and driving a high pass filter of the handshake detector; and
   while the high pass filter is driven, adjusting a location of the focusing lens according to a difference value between the amount of handshake detected by the handshake detector and a location of the focusing lens sensed by the lens location detector to return the focusing lens to a center position.

10. The method of claim 9, wherein the adjusting a location of the focusing lens comprises:
    determining whether the focusing lens is returned to the center portion in an X-axis and a Y-axis of the lens, and
    adjusting the location of the focusing lens when the lens is returned at the center portion.

11. A method of correcting handshake in a digital image processing apparatus, the method comprising during a shutter operation:
    driving a focusing lens by a lens driving unit;
    sensing a location of the focusing lens when the lens driving unit drives the focusing lens;
    detecting an amount of handshake from a signal representing a movement of the digital image processing apparatus; and
    adjusting the lens driving unit according to a difference value between the detected amount of handshake and the sensed location of the focusing lens;
    and after the shutter operation is deactivated:
    removing the noise components from the signal representing the amount of handshake using a high pass filter;
    adjusting the lens driving unit according to a difference value between the detected amount of handshake and the sensed location of the focusing lens; and
    wherein the focusing lens is returned to the center portion in an X-axis and a Y-axis of the focusing lens after applying the high pass filter.

12. The method of claim 11, wherein the speed of return is determined by the blocking frequency of the high pass filter.

13. The method of claim 11, comprising, after a shutter of the digital image processing apparatus is full-pushed, turning on the high pass filter and turning on a live view screen before the lens returns to a center portion.

14. The method of claim 11, wherein when the shutter that is in a half-pushed position is released without performing a photographing operation, the high pass filter is applied.

15. A method of correcting handshake in a digital image processing apparatus, which comprises a handshake correction apparatus including a lens location detector for detecting a location of a focusing lens when a photographing lens is driven; and a handshake detector for detecting handshake from a signal representing a movement of the digital image processing apparatus and removing noise components by using a high pass filter, the method comprising:

driving the handshake correcting apparatus when a shutter of the digital image processing apparatus is half-pushed;

when the half-pushed shutter is released, driving the high pass filter of the handshake detector after the half-pushed shutter is released; and while the high pass filter is driven, adjusting the location of the focusing lens according to a difference value between the amount of handshake detected by the handshake detector and a location of the focusing lens detected by the lens location detector to return the focusing lens to a center position.

16. The method of claim 15, wherein the adjusting of the focusing lens location comprises adjusting the focusing lens when the lens is returned to the center portion in both of the X-axis and Y-axis of the lens.

17. The method of claim 9, wherein a new photographing operation is performed during adjusting the location of the focusing lens.

18. The method of claim 9, wherein the amount of handshake is obtained by receiving the signal representing the movement of the digital image processing apparatus, converting the received signal into a digital signal, and performing an integral calculation with respect to the signal.

19. The method of claim 9, wherein the handshake correction apparatus uses a release mode handshake correction function.

20. The method of claim 15, wherein a new photographing operation is performed during adjusting the location of the focusing lens.

21. The method of claim 15, wherein the amount of handshake is obtained by receiving the signal representing the movement of the digital image processing apparatus, converting the received signal into a digital signal, and performing an integral calculation with respect to the signal.

22. The method of claim 15, wherein the handshake correction apparatus uses a release mode handshake correction function.

* * * * *